US008864973B2

(12) United States Patent
Hughes et al.

(10) Patent No.: US 8,864,973 B2
(45) Date of Patent: Oct. 21, 2014

(54) DEVICE FOR DIELECTROPHORETIC MANIPULATION OF PARTICLES

(75) Inventors: Michael P. Hughes, Guilford (GB); Kai F. Hoettges, Guilford (GB); Stephen Ogin, Guilford (GB); Reg Wattingham, Guilford (GB)

(73) Assignee: University of Surrey, Surrey (GB)

( * ) Notice: Subject to any disclaimer, the term of this patent is extended or adjusted under 35 U.S.C. 154(b) by 1707 days.

(21) Appl. No.: 10/547,246

(22) PCT Filed: Feb. 27, 2004

(86) PCT No.: PCT/GB2004/000815
§ 371 (c)(1), (2), (4) Date: May 15, 2006

(87) PCT Pub. No.: WO2004/076060
PCT Pub. Date: Sep. 10, 2004

(65) Prior Publication Data

US 2006/0231405 A1 Oct. 19, 2006

(30) Foreign Application Priority Data

Feb. 28, 2003 (GB) .................................. 0304720.6

(51) Int. Cl.
*B01D 57/02* (2006.01)
*G01N 27/447* (2006.01)
*B03C 5/02* (2006.01)
*B01L 3/00* (2006.01)

(52) U.S. Cl.
CPC ........... *B03C 5/028* (2013.01); *B01L 3/502761* (2013.01); *B01L 2400/0487* (2013.01); *B01L 2400/0415* (2013.01); *B01L 2200/0647* (2013.01); *B01L 2400/0457* (2013.01); *B01L 3/502707* (2013.01)
USPC .......................................... 204/643; 204/547

(58) Field of Classification Search
USPC ................................................. 204/547, 643
See application file for complete search history.

(56) References Cited

U.S. PATENT DOCUMENTS

| | | | | |
|---|---|---|---|---|
| 4,938,997 | A * | 7/1990 | Keaton | 427/103 |
| 6,149,789 | A * | 11/2000 | Benecke et al. | 204/547 |
| 6,168,948 | B1 * | 1/2001 | Anderson et al. | 435/287.2 |
| 6,467,630 | B1 * | 10/2002 | Zborowski et al. | 209/459 |
| 6,878,255 | B1 * | 4/2005 | Wang et al. | 204/452 |
| 2001/0047941 | A1 * | 12/2001 | Washizu et al. | 204/547 |
| 2002/0037499 | A1 * | 3/2002 | Quake et al. | 435/5 |

(Continued)

FOREIGN PATENT DOCUMENTS

| | | | | |
|---|---|---|---|---|
| WO | WO 99/60392 A1 | 11/1999 | | G01N 27/403 |
| WO | WO 01/43870 A2 | 6/2001 | | B01J 19/00 |
| WO | WO 03/002249 A2 | 1/2003 | | B01J 19/00 |

OTHER PUBLICATIONS

Talary, et al., "Electromanipulation and separation of cells using travelling electric fields," J. Phys. D: Appl. Phys. 29 (1996), pp. 2198-2203.

*Primary Examiner* — Luan Van
*Assistant Examiner* — Gurpreet Kaur
(74) *Attorney, Agent, or Firm* — Heslin Rothenberg Farley & Mesiti P.C.

(57) ABSTRACT

A device for dielectrophoretic manipulation of suspended particulate matter comprises a plurality of interleaved layers of electrically conductive and non-conductive material wherein at least one channel is defined through a plurality of the interleaved layers of electrically conductive material.

26 Claims, 7 Drawing Sheets

(56) References Cited

U.S. PATENT DOCUMENTS

2002/0172969 A1* 11/2002 Burns et al. ........................ 435/6
2003/0010636 A1* 1/2003 Birkbeck et al. .............. 204/547
2005/0072677 A1* 4/2005 Gascoyne et al. ............ 204/547

* cited by examiner

DEVICE FOR DIELECTROPHORETIC MANIPULATION OF PARTICLES

CROSS-REFERENCE TO RELATED APPLICATIONS

This application is a continuation of PCT Application PCT/GB2004/000815, filed Feb. 27, 2004, and published under the PCT Articles in English as WO 2004/076060 A1 on Sep. 10, 2004. PCT/GB2004/000815 claimed priority to Great Britain Application No. GB0304720.6, filed Feb. 28, 2003. The entire disclosures of PCT/GB2004/000815 and Great Britain Application Serial No. GB0304720.6 are incorporated herein by reference in their entirety.

BACKGROUND OF THE INVENTION

1. Technical Field

The present invention relates to a device and a method for dielectrophoretic manipulation of suspended particulate matter. In addition the invention relates to a method for production of the device.

2. Background Information

Within the context of the present application, the word "comprises" is taken to mean "includes among other things," and is not taken to mean "consists of only."

The terms electrically "non-conductive" and "insulating" as used herein are interchangeable and have the same meaning. They are interpreted to mean "substantially electrically non-conductive."

The term "manipulation" is interpreted to include known laboratory or plant techniques including analysis, filtration, fractionation, collection or separation.

Dielectrophoresis (DEP) is a well known technique for separation based on the manipulation of particles in non-uniform electric fields. It can be used for separation of particles, either by binary separation of particles into two separate groups, or for fractionation of many populations. It can also be used for the collection of particles and for transport of particles along an electrode array. It is based generally on exploitation of differences in the dielectric properties of populations of particles. This enables a heterogeneous mix of particles to be fractionated by exploiting small differences in polarizability or by using a dielectrophoretic force in conjunction with other factors such as imposed flow or particle diffusion.

If a dielectric particle is suspended in an electric field, it will polarize and there is an induced dipole. The magnitude and direction of this induced dipole depends on the frequency and magnitude of the applied electric field, and the dielectric properties of particle and medium. The interaction between the induced dipole and the electric field can generate movement of the particle, the nature of which depends on a number of factors including the extent to which the field is non-uniform both in terms of magnitude and phase.

If the electric field is uniform, the attraction between the dipolar charges and the electric field is equal and opposite and the result is no net movement, unless the particle carries a net charge and the field frequency is equal to, or near, zero. However, if the field is spatially non-uniform, the magnitude of the forces on either side of the particle will be different, and a net force exists in the direction in which the field magnitude is greatest. Since the direction of force is governed by the spatial variation in field strength, the particle will always move along the direction in which the electric field increases by the greatest amount; that is, it moves along the direction of greatest increasing electric field gradient regardless of field polarity. Since the direction of motion is independent of the direction of the electric field polarity, it is observed for both AC and DC fields; the dipole re-orients with the applied field polarity, and the force is always governed by the field gradient rather than the field orientation. The magnitude and direction of the force along this vector is a complex function of the dielectric properties of particle and medium. If a force exists in a direction of increasing field gradient, it is termed positive DEP. Its opposite effect, negative DEP, acts to repel a particle from regions of high electric field, moving it "down" the field gradient. Whether a particle experiences positive or negative DEP is dependent on its polarizability relative to its surrounding medium; differences in the quantity of induced charge at the interface between particle and medium lead to dipoles oriented counter to the applied field (and hence positive DEP) where the polarizability of a particle is more than that of the medium, and in the same direction as an applied field (and hence negative DEP) where it is less. Since relative polarizability is a complex function dependent not only on the permitivity and conductivity of the particle and medium, but also on the applied field frequency, it has a strong frequency dependence and particles may experience different dielectrophoretic behavior at different frequencies.

Where there are non-uniformities in phase, a different but related phenomenon is observed. An electric field having a peak which moves through space over a time can be described as a wave whose phase varies with position. Where an electric field moves across the particle, a dipole is induced that also moves. If the velocity of the field across a particle is sufficiently high, then the dipole (which takes a finite time to respond to the field, dictated by its dielectric relaxation time) will lag behind it at a finite distance; the interaction between peaks in an electric field and the physically displaced dipole induces a force which acts on the particle. The direction of the force is dependent on polarizability: if the particle is more polarizable than the medium then the dipole aligns counter to the electric field, causing an attractive force to be induced resulting in the particle moving in the same direction of movement as the local applied field; if the particle is less polarizable than the medium then the dipole (and net particle motion) are reversed. Similarly, if the displacement of the dipole is greater than half the wavelength of the electric field as it moves through space, then it will interact with a preceding field maximum resulting in a reversal of direction. The name given to this effect is traveling wave dielectrophoresis (TWD). Since it is possible to generate an electric field with spatially variant electric field magnitude and phase, a particle suspended in such a field will experience both DEP and TWD simultaneously, with the vectors of force acting (i) along the direction of a maximum change in electric field; and (ii) along the direction of a maximum change in field phase.

DEP can be used for detection, fractionation, concentration or separation of complex particles. Additionally, studying the DEP behavior of particles at different frequencies can allow the study of the dielectric properties of those particles. For example, it can be used to examine changes in cell cytoplasm in cells after infection by a virus. This potentially enables detection where the differences between cell types are subtle and could be applied to the separation or detection of cancerous or healthy cells, viable or non-viable cells, leukaemic cells in blood, different species of bacteria and placental cells from maternal blood.

Thus, it is clear that DEP can be a versatile technique for detection, analysis, fractionation, concentration or separation. In view of this, significant interest is being invested in dielectrophoresis technology. However, at present DEP is based on planar two dimensional technology, developed for the silicon chip industry. The known electrodes (usually gold) are fabricated from thin layer films (typically up to 1 μm thick) on a glass substrate (e.g., a microscope slide). They are expensive to produce, and the volume above the electrodes in which the electric field penetrates is limited to a few tens of microns, meaning the overall volume of sample is small and the effectiveness of the known devices is severely limited. Thus, there is a need for a new device for dielectrophoretic separation of suspended particulate matter.

High throughput screening is conventionally used to evaluate a large number of candidate compounds for their possible use as pharmaceutical drugs. To do this, experiments are often carried out on living cells (e.g., bacteria or tissue cultures), which are subjected to small amounts of possible candidate chemicals and monitored to check for desired changes. Monitoring is carried out using several known techniques, e.g., selective chemical staining or monitoring pH changes with chemical indicators. To perform a large number of experiments in the quickest possible time they are carried out in parallel and to save on reagents the experiments are generally carried out in well plates. These plates have a large number of small wells wherein each well can be used to contain the reagents for performing one experiment. Known plates have 384 or 1536 wells, while each well is capable of containing only a few microliters of sample. To perform even more parallel experiments with even smaller samples new plates having even more wells are currently under development.

Finding a technique for assessing the results of experiments performed in such a small volume can be difficult, especially since most known detection methods require the presence of an indicator or dye that might itself interact with the organism or the drug candidate. Therefore, DEP can be a valuable tool to evaluate these assays since it can detect changes in the morphology of cells without any marker chemicals. In view of the fact that DEP can separate particles based on their dielectric properties, bacteria or cells can be detected based on properties of the cell wall or membrane. This can be used for bioassays to evaluate whether a drug candidate interacts with a receptor at the cell wall or membrane. However, because conventional DEP assays are performed with flat two dimensional electrode structures the electric field generated by the electrodes does not penetrate sufficiently far into liquid media and therefore until now it has only been possible to probe a very small sample volume. Therefore, there is a need for a new electrode structure that can be used to probe a larger volume within a small well to allow quick analysis of a sample of several micro-liters.

SUMMARY OF THE INVENTION

Remarkably, a new device has been constructed which is based on a new three dimensional electrode structure using laminated insulating and layers of conductive material of the order of microns thick, through which holes have been drilled. This provides the advantage that particle separators can be produced with considerably large effective volumes, since a large number of small holes can be drilled through a postage stamp sized laminate sheet, dramatically increasing the effectiveness of the device. Furthermore, the device is easy to fabricate in large quantities, enabling its use in disposable devices, for example.

An advantage of the present invention is its flexible operability. When used to separate different fractions of biological matter, e.g., cells in a cell culture suspension, it may be operated to retain the desired, e.g., viable or cancerous, biological matter in its regular culture medium while removing unwanted, e.g., non-viable or non-cancerous material, from the suspension together with a fraction of the liquid medium, which fraction of liquid medium may thereafter be replenished using fresh medium.

A further advantage of the present invention is its high throughput compared to known devices.

Accordingly, in a first aspect the present invention provides a device for dielectrophoretic manipulation of suspended particulate matter which comprises a three-dimensional laminate of a plurality of interleaved lamellas of electrically conductive and non-conductive material wherein at least one channel is defined through a plurality of the interleaved layers of electrically conductive material, the at least one channel being cylindrical in shape and round in cross-section and means for electrically connecting the lamellas of electrically conductive material to at least AC signal. The particles travelling through the channel(s) exhibit three-dimensional movement.

In use, preferably alternating electric potentials of a first phase are applied to alternate layers of conductive material to generate electric fields in at least one channel and this allows separation of particulate matter in the channel. Preferably, alternate layers of conductive material are connected to a first phase of an AC signal and the layers of conductive material between those connected to the first phase are connected to the anti-phase of the AC signal. Analyte is passed through the channel preferably under pressure generated by a pump and/or gravity and conditions (suspending medium, field frequency etc) are selected such that some types of particle (e.g., cancer cells) are retained at the walls of the channel, and the remaining particles (e.g., healthy blood cells) pass through the channel and are optionally detected.

Therefore, preferably an embodiment of a device according to the invention comprises means for electrically connecting first alternate layers of conductive material to a first phase of an AC signal and means for connecting layers of conductive material between the first alternate layers to a second phase of an AC signal.

It will be appreciated that an AC signal is neither positive nor negative but oscillates around a neutral potential and has on average a neutral potential. In use, the signal has (i) a connection to phase and a connection to ground or (ii) a connection to phase and a connection to anti-phase. These alternatives are included within the scope of the application and they have only minor technical differences. In the case of connection to phase and ground, the phase has an alternating potential in relation to the ground, which has a neutral potential. In contrast, in the case of connection to phase and anti-phase, both signals have an alternating potential relative to ground, but the anti-phase signal has an inverted or 180° shifted potential relative to the phase signal. Therefore, in practice, the signal applied may vary only in amplitude since phase to ground is equivalent to half the amplitude between phase and anti-phase.

In practice, devices having means for electrically connecting layers of conductive material to only two phases of an AC signal have means for connecting first alternate layers of conductive material to phase and means for connecting layers of conductive material between the first alternate layers to ground. In contrast, devices having means for electrically connecting layers of conductive material to more than two phases of an AC signal (for example three or four phases) have means for connecting layers of conductive material to shifted phases (for example three or four shifted phases). The shift of the phases can be equal or unequal.

Preferably an embodiment of a device according to the invention comprises means for electrically connecting layers of conductive material to different AC signals or AC signals of different frequencies. This provides the advantage that complex separations can be achieved using only one device according to the invention. For example for the isolation of one predefined particle from a suspension comprising a mixture of three or more particles. In this example, particle (a) is attracted to the wall of a first part of a channel of the device by frequency (1) while particles (b) and (c) are repelled. In contrast, particle (b) is attracted to the wall of a second part of the channel by frequency (2) while particle (c) is repelled. In this example only particle (c) passes through the channel. Thereafter, particles (a) and (b) can be selectively purged.

Preferably, an embodiment of the invention comprises alternating layers of electrically conductive and non-conductive material wherein the layers of conductive material are connected to more than two different phases of an AC signal.

Preferably, an embodiment of the invention having more than two phases has the layers of conductive material subsequently connected to a number of phases summing to 360°, for example four phases of an AC signal shifted at 0°, 90°, 180°, 270°.

Preferably, an embodiment of the invention having more than two phases is capable of performing traveling wave dielectrophoresis and is capable of moving different kinds of particles in different directions though the channels.

Preferably, an embodiment of a device according to the invention comprises about 10 to about 50, more preferably about 20 layers of electrically conductive material. In addition, an embodiment of a device according to the invention preferably comprises about 9 to about 49, more preferably about 19 layers of electrically non-conductive material. However, it will be appreciated that the minimum number of layers of conductive material should be 2 and a maximum number of layers of conductive material is limited only by the ability to form (e.g., by drilling) at least one channel through the entire thickness of the laminate. Preferably the layers of non-conductive material insulate the layers of conductive material from each other; where they fail to do so, cutting the external connections to the conducting adjacent layers will restore functionality.

Preferably the interleaved layers are laminated to provide a laminate which is preferably postage stamp-sized having a length of about 1 cm to about 4 cm, more preferably about 3 cm and a width of about 1 cm to about 4 cm, more preferably about 3 cm.

Preferably, alternate layers of electrically conductive material project from a first end of the laminate and layers of electrically conductive material between the alternate layers project from a second end of the laminate distal to the first end. This provides the advantage that electrically conductive material which projects from one end of the laminate can be easily connected to a the phase and electrically conductive material which projects from another end of the laminate can be easily connected to the anti-phase of an AC signal.

Preferably the layers of electrically conductive material are produced of metal foil or metal coated insulating foil preferably having a thickness of about 5 mm to about 15 mm, more preferably about 10 mm. Preferably the metal is selected from the group which consists of aluminum and gold.

Preferably the layers of electrically non-conductive material are produced of a low temperature curing polymer film preferably having a thickness of about 50 mm to about 150 mm, more preferably about 100 mm. Preferably the low temperature curing polymer film is selected from the group which consists of LTA45 NCB which is commercially available from Advanced Composites Group.

Preferably, an embodiment of a device according to the invention has about 50 to about 300 channels. In a preferred embodiment a device according to the invention has 200 channels. In an alternative embodiment there are about 300 to about 2000 channels, for example 1536 channels. This number is preferred because it offers the advantage of compatibility with known and commercially available plate formats.

Preferably, an embodiment of a device according to the invention has channels having a diameter of about 0.4 mm to about 1.0 mm. In a preferred embodiment the channels have a diameter of 500 μm.

Preferably, an embodiment of the invention comprises one or more cylindrical channels. An alternative embodiment comprises one or more non-cylindrical channels, for example a channel may be a groove defined through a plurality of the interleaved layers of electrically conductive material.

Preferably, an embodiment of the invention comprises substantially planar layers which are substantially parallel and a longitudinal axis of the channel is inclined substantially perpendicular to the layers. In an alternative embodiment, a longitudinal axis of the channel is inclined non-perpendicular to the layers.

Preferably, an embodiment of a device according to the invention for use in high throughput screening comprises at least one channel which closed at a first end of the channel to provide at least one well or chamber. Preferably the well or chamber is produced of a transparent material in this case the layers of conductive material are preferably indium tin oxide and the layers of non-conductive material are preferably a transparent polymer such as polycarbonate, polymethylmethacylate (Perspex) or polyethylenetelephthalate (PET), more preferably the conducting and layers of non-conductive material comprise aluminum and plastics and only the bottom of the well comprises a transparent material such as glass, quartz polycarbonate or polymethylmethacylate (Perspex) so a well can be probed by a light beam. If particulate matter is repelled by a field generated in the well it concentrates in the centre of the well and scatters the light beam. In contrast, if it is attracted it concentrates at an edge of the well and reduces light scattering.

Preferably, an embodiment of the invention comprises a large number of wells to provide a multi well plate. This provides the advantage that the invention can be used to integrate DEP separation into a widely used assay format and provides an improvement to known high throughput assays since enables DEP to be used for cell-based bioassays.

Most preferably the device comprises a plate containing 1536 wells with a depth of 1 to 8 mm and has the same outer dimensions (about 7 cm to about 9 cm×about 10 cm to 15 cm; or about 8.6 cm×about 12.8 cm) as conventional multi well plates.

Advantageously, with regard to performance, a device according to an embodiment of the invention has channels which each correspond to a version of a conventional two dimensional device having a 3×3 mm electrode. In addition, the total area of a device having 100 channels is equivalent to a conventional two dimensional device having a 3×3 cm electrode. Furthermore, since an embodiment of a device according to the invention has a larger parallel volume compared to a conventional device, the trapping efficiency compared to conventional devices is greatly increased.

With regard to cost, the invention provides the advantage that a device for dielectrophoretic manipulation of suspended particulate matter can be produced with low fabrication costs. In addition, because a device according to the invention enables highly parallel separation, it is well suited to disposable cartridge-based separation methods for medical and biological applications, as well as dielectrophoretic assay techniques.

In a second aspect the invention provides a method for dielectrophoretic separation of suspended particulate matter which comprises the steps of placing a sample suspension of particulate matter within a channel of an embodiment of a first aspect of the invention and generating a field in the channel.

Preferably, an embodiment of the invention is used in filtration of particle-laden liquid or gas.

Preferably, an embodiment of the invention is used for collection of a predetermined particle from a particle-laden liquid or gas (e.g. cancerous cells from blood).

Preferably, an embodiment of the invention is used for traveling wave dielectrophoresis to move different kinds of particles in different directions within the embedded channel.

Preferably, an embodiment of the method is used for high throughput screening.

Preferably, an embodiment of the invention is used in conjunction with one or more known assays. For example the invention can be used in conjunction with other conventional assays such as fluorescence-based assays or antibody-based assays.

In a third aspect the invention provides a method for production of a device for three dimensional dielectrophoretic manipulation of suspended particulate matter. The method includes laminating about 10 to about 50 alternate lamellas of electrically conductive and non-conductive material to produce a three-dimensional laminate, allowing the laminate to cure, drilling channels in the laminate, each channel having a cylindrical shape and a round cross-section and electrically connecting the lamellas of electrically conductive material to at least one AC signal, Particles travelling through the cylindrical channel(s) exhibit three-dimensional movement.

Preferably an embodiment of a method according to the invention comprises connecting layers of conductive material to two phases of an AC signal.

Preferably an embodiment of a method according to the invention comprises connecting first alternate layers of conductive material to phase and connecting layers of conductive material between the first alternate layers to ground.

Preferably an embodiment of a method according to the invention comprises connecting layers of conductive material to more than two phases of an AC signal (for example three or four phases).

Preferably an embodiment of a method according to the invention comprises connecting layers of conductive material to different AC signals.

While a device according to a first embodiment of the present invention is generally suitable for the separation of any polarizable particular matter in a liquid suspension, it is preferred that its main application is in the fields of microbiology, biotechnology and medicine, for the separation of polarizable biological matter. Such biological matter includes viruses or prions, cell components such as chromosomes or biomolecules such as oligonucleotides, nucleic acids, etc., as well as prokaryotic and eukaryotic cells, and preferably comprises plant, animal or human tissue cells. It may be used to separate different kinds of biological material such as cancerous and non-cancerous cells from each other but it may also be applied to remove viable from non-viable cells. Furthermore, it considered that the invention will find utility as a filtration device in water purification and testing, and in the brewing industry.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Multiple frequencies could be applied to one device when a number of layers at the top are connected to one frequency, while a number of layers at the bottom are connected to a second frequency. The invention includes devices having means for connection to one, two or more AC signals having different frequencies.

For the purposes of clarity and a concise description features are described herein as part of the same or separate embodiments, however it will be appreciated that the scope of the invention may include embodiments having combinations of all or some of the features described.

Figure 1:
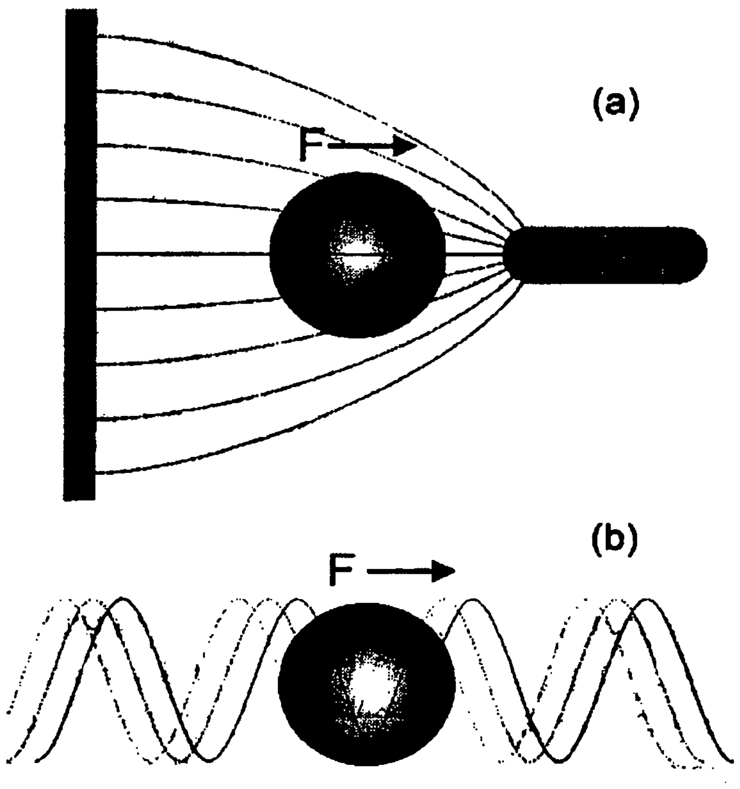
FIG. 1 shows a schematic wherein a particle is suspended in an alternating electric field which contains either a magnitude or phase gradient, a force is induced on the particle which acts either in the direction of the gradient or opposes it, according to whether or not the particle is more or less polarizable than the medium in which it is suspended. A particle experiences a force due to (a) a non-uniform electric field (magnitude gradient); (b) a traveling electric field (phase gradient).
Figure 2:
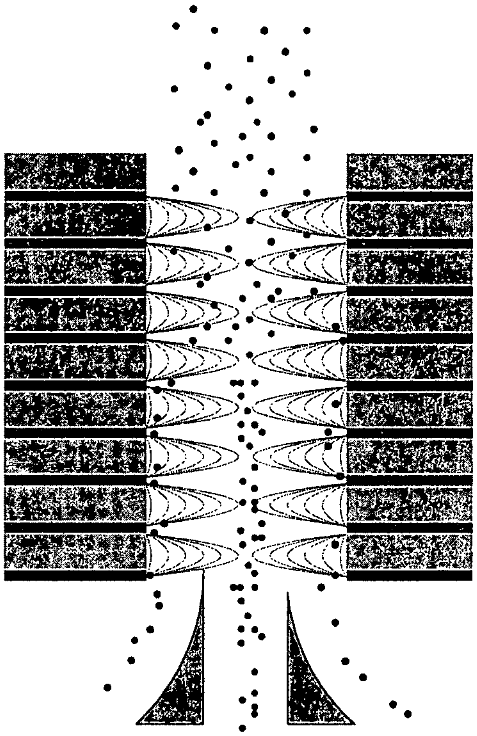
FIG. 2 shows a diagram of a device having layered electrodes wherein layers of electrically conductive material of alternating polarity are separated by an insulator. There is a high field gradient at the sides of the channel and a low field gradient in the centre. Depending on conditions, particles are attracted or repelled by the field gradient. The device can be used as a dielectric flow separator wherein one species of particle is attracted by the field gradient and another is repelled. The repelled particles are concentrated into the middle of the channel while the attracted particles flow slowly adjacent the wall of the channel. The flow can be split after passing through the channel into a sample from the centre of the flow containing repelled particles and a sample from adjacent the wall of the channel containing attracted particles.
Figure 3:
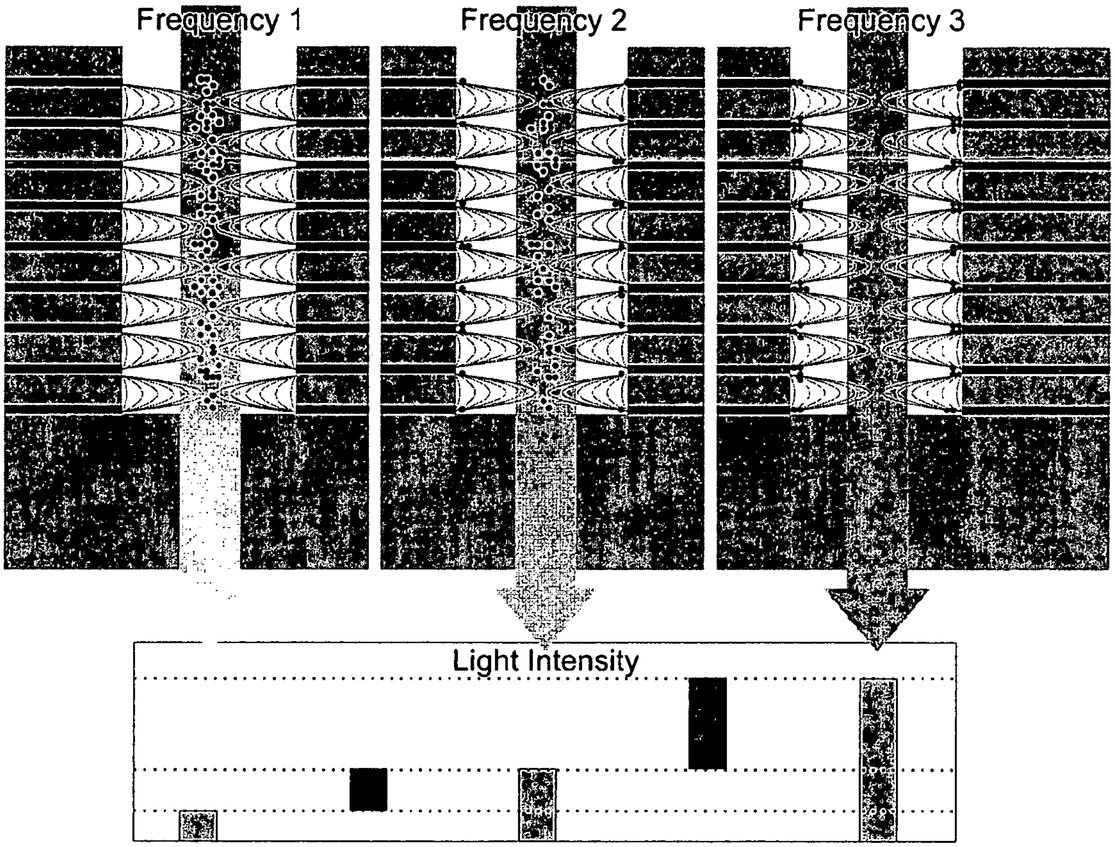
FIG. 3 shows a diagram of a dielectrophoretic multi well plate. Multi well plates can determine the composition of a cell mixture, for example by measuring light intensity at different frequencies.
Figure 4:
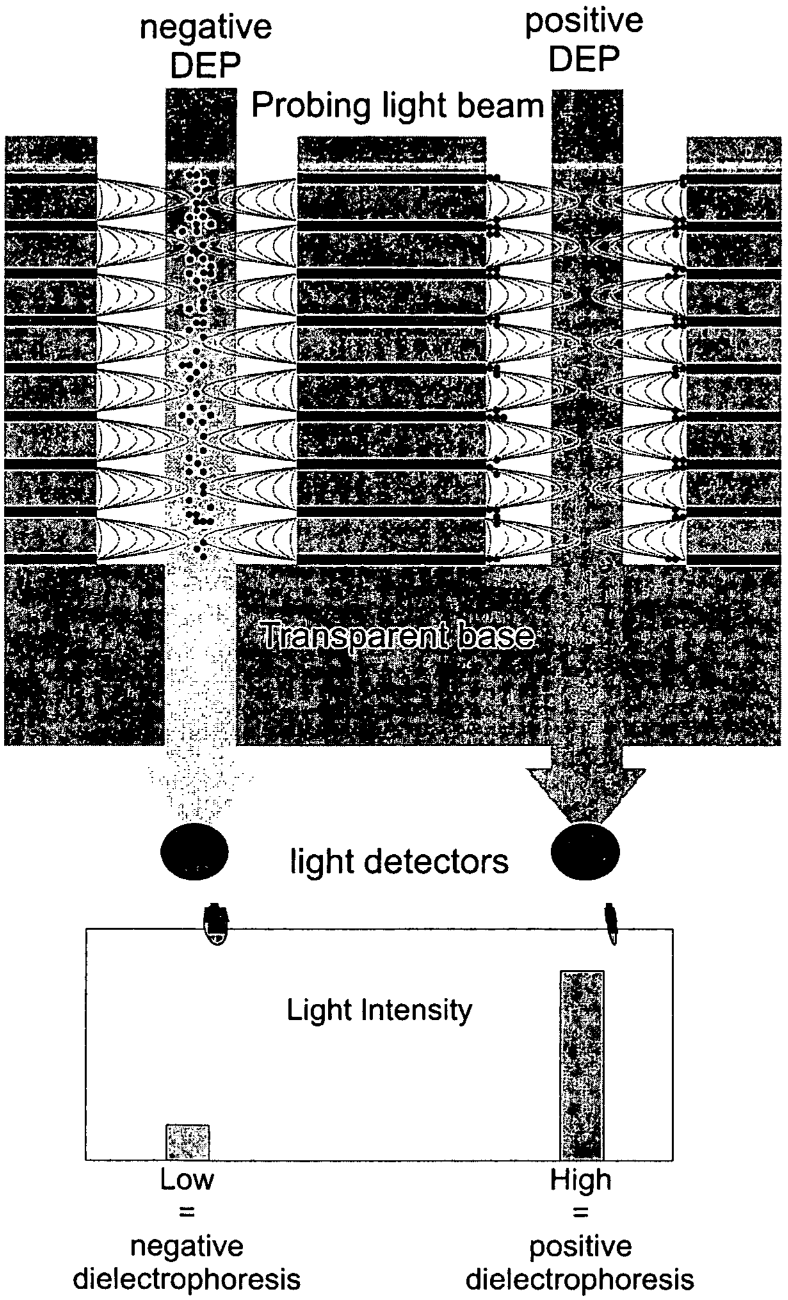
FIG. 4 shows a diagram of a dielectrophoretic multi well plate wherein small wells are filled with bacteria or a cell suspension. Positive DEP removes cells from the bulk liquid and reduces light scattering. Negative DEP concentrates particles in the middle of the well and increases light scattering. Both can be detected easily, for example by measuring the amount of light transmitted.
Figure 5:
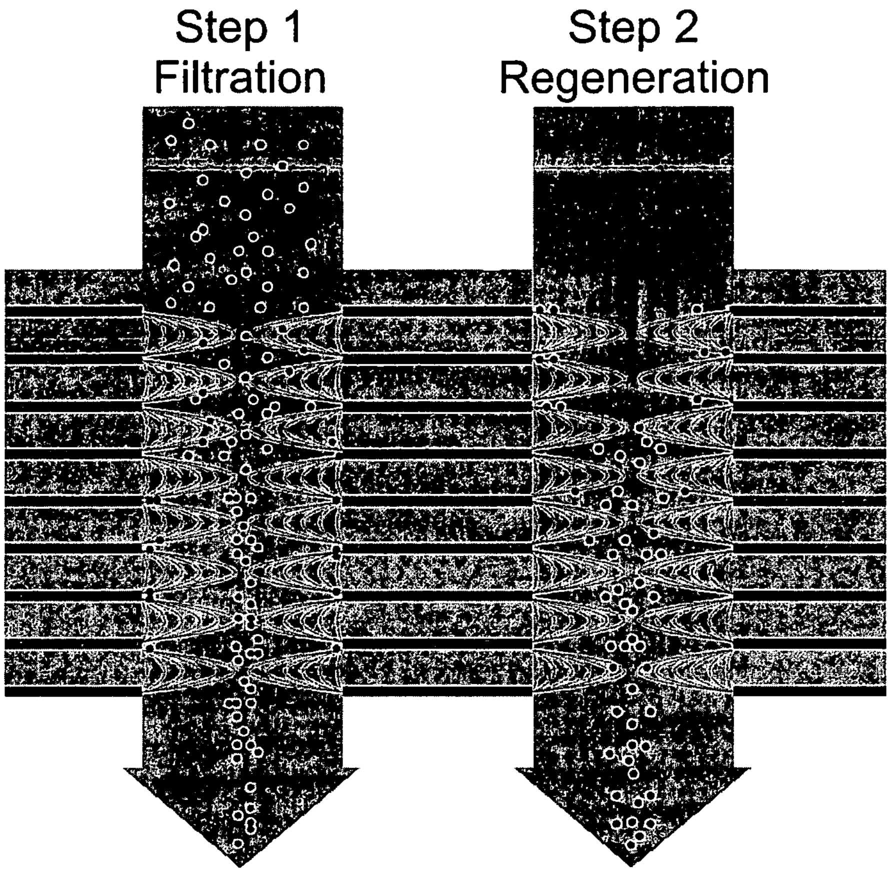
FIG. 5 shows a diagram of a dielectrophoretic filter wherein a species of particle is attracted by the field gradient concentrating it adjacent the wall of the channel and a second species of particle is concentrated in the centre of the channel distal to the wall of the channel. Thereafter, the filter is regenerated by changing the field frequency to repel the first species of particle and purge it from the filter.
Figure 6:
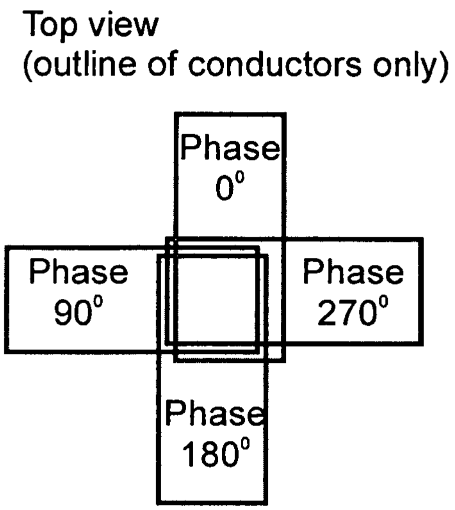
FIG. 6 shows a diagram of a device according to the invention wherein more than two phases of an AC signal have been connected to layers of conductive material. The diagram shows the layout for fabrication of a four-phase device. Channels are be drilled where all four conducting layers overlap.
Figure 6:
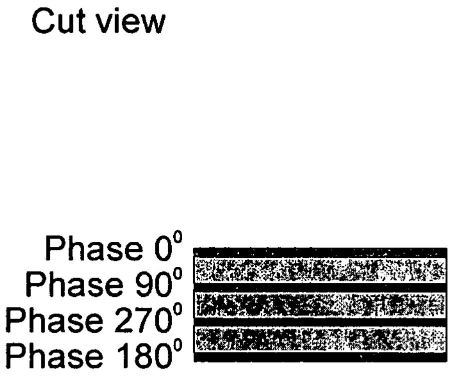
Figure 7:
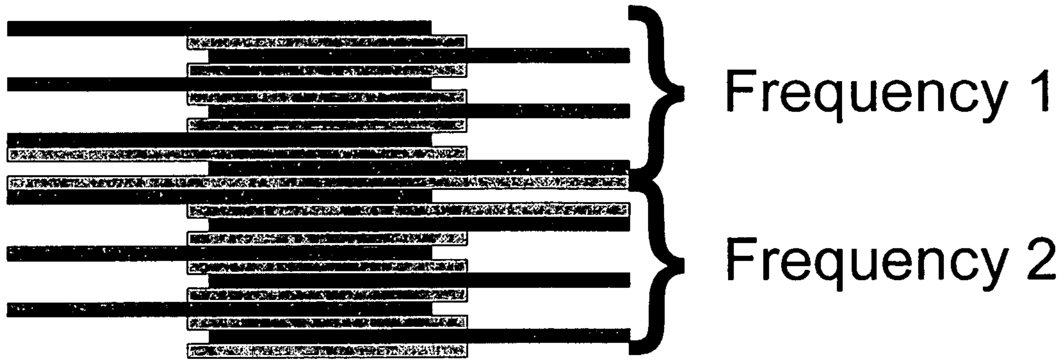
FIG. 7 shows a diagram of a device according to the invention wherein a number of layers has been connected to an AC signal having a first frequency (e.g. the top 20 layers), while other layers (e.g. the bottom 20 layers) have been connected to an AC signal having an alternative frequency.

As seen in FIGS. 1 to 5, a device for dielectrophoretic separation of suspended particulate matter comprises a laminate of 20 interleaved layers of electrically conductive aluminum foil having a thickness of 10 mm and 19 layers of electrically non-conductive LTA45 NCB having a thickness of 100 mm wherein 288 channels each having a diameter of 500 μm are defined in the interleaved layers.

The interleaved layers are laminated to provide a laminate which is postage stamp-sized having a length of 1.5 cm and a width of 1.5 cm. Alternate layers of aluminum foil project from a first end of the laminate and layers of aluminum foil between these layers project from a second end of the laminate distal to the first end.

A plate comprising wells in a laminate of interleaved layers of electrically conductive and non-conductive material has a glass plate as a bottom. This well plate embodiment will use for bioassays.

In use, a cell suspension is added to each well together with a portion of a different agent, a different amount of the same agent or both, in each well. The assay can evaluate the reaction of the cells to the agent added to each well and therefore perform a large number of experiments at a time. The embodiment has 1536 wells and the same dimensions as a conventional multi-well plate.

An other embodiment comprises a plate having channels through a laminate of interleaved layers of electrically conductive and non-conductive material. The plate separates two liquid reservoirs and liquid is directed by a higher hydrostatic pressure in one reservoir though the channels to the other reservoir.

In use, analyte is pumped through the channels and conditions (suspending medium, field frequency, etc.) are selected such that some types of particle (e.g., healthy blood cells) remain stuck to walls of the channel, and the remaining particles (e.g., cancer cells) pass through the channel and are optionally detected.

EXAMPLE

Methods

Separator Design and Dimensions

Devices for DEP separation were produced comprising laminates having 20 layers of electrically conductive material (aluminum foil) and 19 layers of a non-conductive material (epoxy resin film) layers, each laminate having a plurality of channels therein.

An array of dielectrophoretic separation channels of bore diameters 1 mm and 0.5 mm; were designed in a circular working area of 22 mm diameter. The height of the channels, and hence the depth of the laminate was 2 mm±0.5 mm.

Each laminate had a width and length of 30 mm by 30 mm respectively, this allowed for the drilling of channels within the 22 mm diameter mentioned above. Electrically conductive material that energized the dielectrophoretic chamber array projected from each end of the laminate at a length of 70 mm. Each layer of conductive material in the laminate had a thickness of 20 μm and was spaced 100 μm apart from adjacent layers of conductive material.

Materials and Construction

Two aluminum templates were created for cutting aluminum foil and epoxy resin film layers, 100×100 mm and 30×100 mm respectively. Sharp knifes were adequate to cut the layers. Using a calibrated Mitutoyo micrometer, 5 measurements of the thickness of the aluminum foil were taken and averaged to determine the thickness of the aluminum foil.

The layers were carefully stacked to form a laminate by placing epoxy film layers between the aluminum foil layers, with aluminum foil layers projecting from alternate ends of the laminate.

The laminate consisted of 20 aluminum foil layers and 19 epoxy film layers, and was placed between release film (inner) and glass plates (outer). It was then placed in an oven and cured at 55° C. (calibrated by thermocouple), overnight for 16 hours. A weight of 0.94 kg was placed on the upper glass plate to decrease the overall thickness of the structure from 6 mm to 2 mm±0.5. To ensure that the laminate remained stable while curing in the oven, a jig was constructed on the lower glass plate. The jig consisted of 2 metal rods that spanned the length of the lower glass plate. The rods were 4 mm thick and arranged parallel to each other 70 mm apart. Tape was used to secure the rods to the bottom glass plate and release film was placed over the jig. The laminate was then placed in the jig with aluminum foil layers projecting up and over the 2 metal rods. This ensured that curing resin film did not escape from the laminate to the loose aluminum foil at each end of the laminate. A second release film was placed atop the laminate; the release film enabled the structure to be easily removed after the resin film had cured and helped to prevent unwanted adhering of the resin. A glass plate was cut with dimensions of 70 mm width and 110 mm length, and was placed atop the second release film. Pressure was applied to the top glass plate to decrease the thickness of the laminate, and the plate was sized so that it was not inhibited from vertical movement within the jig, thereby reducing instability whilst curing. Metal blocks were also placed abutting the sides of the laminate to ensure the top glass plate did not slide.

To check devices were usable, they were subjected to an insulation test. This test was carried out to check that construction of the structures had no inter-electrode layers touching, hence no conduction path was present when subjected to a direct current. The non-conductive dielectric material (epoxy resin film) between each conductive layer (aluminum foil) ensured that the electrodes didn't touch each other. To overcome the potential for this problem arising on cutting of cured laminate into strips, the strips were polished down with graded sanding paper until the laminates were fully insulated. Due to the uncertainty of the drilling process, it was decided that 0.5 mm and 1 mm bores would be drilled to provide the channels. A jig was created to hold a device in position for drilling and drilled at a speed of 3000 rpm. The insulation test was repeated after drilling to ensure there was still no conduction path.

The thickness of the laminate before curing was measured to be 6 mm±0.5 mm. This was reduced by application of a 0.94 kg weight on top glass plate covering the layered portion of the structure. It will be apparent that the thickness of the structure can be decreased further, by increasing the weight applied.

In practice the thickness of the epoxy layer was not constant, but ranged between 130-150 μm. The aluminum foil thickness measured before curing was found to be 30 μm and remained at that thickness after curing.

Separator Casing

A casing for the device was constructed of Perspex (Aquarius Plastics, Surrey). This was chosen because of its reasonable compatibility with biological materials, ease of machining in a workshop and due to its transparent appearance allowing observation of experiments.

To ensure analyte was able to flow through the array of channels a fluid inlet was positioned directly above the array. This was primarily, to minimize any errors in cell counting. A facility for creating a head of pressure was included by way of an adjustable piston this enabled optimal flow rates through the channels to be provided if necessary.

After 16 hours of curing, the laminate was cut into strips with a fine tooth saw.

Channels were drilled through the laminate strips, two devices were constructed with 1 mm hole diameters, and two were constructed with 0.5 mm hole diameters.

The total area in which the channels were drilled was $3.8\times10^{-4}$ $m^2$ and the total throughput area of the structure was made to be $5.6\times10^{-5}$ $m^2$.

Experimental Details 2 vials of yeast cells (*Sacc. Cervisiae*), strain type CG-1945[e], were obtained from the School of Biological Sciences, University of Surrey. They had been stored for less than three years at −80° C., in 25% glycerol, as recommended by the suppliers, CLONETECH.

Media Recipes

Pre-made broth and agar (powder) YPD media were purchased from Sigma Aldrich.

Solid Media Preparation 500 mL of distilled water was added to 32.56 g of agar YPD in a clean 600 mL borosilicate laboratory beaker. The beaker was then placed on a magnetic stirrer hotplate and heated to 90° C. for 20 minutes and stirred for 45 minutes. The beaker was covered with aluminum foil to maintain temperature and a mercury thermometer was used to monitor the solution temperature. After stirring the beaker was left to cool to ~55° C. on the bench.

Once the temperature of the media was reduced to about 55° C., some solidification had already occurred at the bottom of the beaker, so it was shaken before being poured. Within a sterile hood five sterile Petri dishes were filled with the agar medium to ⅓ of their capacity. The plates were manipulated to distribute the media. The plates were then sealed with cling film and stored in a fridge at 4° C.

Yeast Stock Plate

One frozen vial of yeast cells was taken out of a freezer and thawed in a fridge for 3 days.

Sterile inoculating loops were used to inoculate 2 Petri dishes with YPD media within a sterile hood. After streaking the inoculum onto the agar, the dishes were incubated at 30° C. for 3 days. After this incubation period colonies were visible on the agar. The dishes were wrapped in cling film and refrigerated at 4° C.

Preparation of Liquid Broth

Broth medium was weighed up to 50 g and added to 1 liter of distilled water. A magnetic stirrer hotplate was used to evenly distribute the media within a 1 liter bottle capable of being autoclaved. After 15 minutes of stirring the bottle was autoclaved for 40 minutes. Thereafter the media was allowed to stand at room temperature until the media was cooled to about 55° C. then stored in the refrigerator at 4° C.

Cell Harvesting

As described by Lee et al, Biotech and Bioeng Symposium, 11, 641-649, rapid determination of yeast viability was determined using methylene blue (MB) to distinguish between live and dead yeast cells. A sample from the Petri dish was centrifuged in a micro-centrifuge and washed twice in distilled water. 20 μl of yeast cells were mixed with 380 μl of MB then examined under the microscope. Viable cells were identified as spherical cells that had not been stained.

200 ml of YPD broth was inoculated with a 3 ml sample of cells with a sterile pipette. The broth was incubated at 30° C. for approximately 24 hours. After incubation the broth was divided into 2×80 ml solutions. An 80 ml solution was centrifuged at 1000 rpm for 10 minutes and washed with 280 mM mannitol three times. Live cells were rendered non-viable by heat-treating them in a water bath at 90° C. for 30 minutes. They were then washed as described above.

Cells were counted using direct microscopic observation, within a hemacytometer.

Experimental Set-Up & Process Flow

Evaluation of a device according to the invention was carried out. A 20 MHz function generator was used to supply a sinusoidal 10 MHz, 10 volt ac signal to the device. A 20 MHz oscilloscope (Hameg, HM203-6) was used to 'see' the input signal.

A syringe pump (Model A-99, Razel Scientific Instrument) was used to flow fluid through channels of the device. Flow rates used are calculated below.

The tubing and the device were washed through with distilled water at 100 ml/hr before each test, to clear cells and other debris from previous experiments. A solution of viable (50% volume) and non-viable (50% volume) cells, was made up to 10 ml. The cells were counted immediately before the test to enhance accuracy of the results.

A 5 ml syringe was loaded with a 50:50 mixture of viable and non-viable cells, with 1 ml volumes being passed through the device. A syringe needle was fixed securely into the tubing with an adhesive, and the articulation was wrapped with cling film to prevent leakage. With an ac signal of 10 volts at 10 MHz applied to the device, and the fluid passing through, it was expected that live cells would be retained in the channels of the device and dead cells would pass through and collect in a receptacle of 5 ml 280 mM mannitol. After collection in the receptacle, distilled water was flushed through the separator at 30 ml/hr to wash.

Thereafter the voltage supplied was discontinued, and the separator was washed with 5 ml 280 mM of mannitol solution at 50 ml/hr into a receptacle with 1 ml of mannitol solution.

Notes

1) Apart from the aforementioned autoclaved materials, all other equipment used was rinsed once with distilled water, washed in 70% alcohol and washed again thoroughly with distilled water.

2) Preparation of slides, mixtures and transferring of cells was all performed within a sterile hood.

3) Sterile micropipette tips are recommended for use once and rubber gloves were also used to handle equipment.

Results

Flow Rates

Optimal flow rates can be obtained from the dielectrophoretic particle velocity, v.

$$v = \frac{dx}{dt}$$

To find the time, t, for which it takes the particle to collect at the electrodes at a distance, x, from the wall we can use the following equations:

$$\int dt = \int \frac{1}{v} dx$$

Rearranging and integrating, we obtain, $$t = \int \frac{dx}{v}$$

v=f(x), a function of $\nabla E_2$ (x,y,z) which can be determined by numerical modeling. The definite integral can be found by using higher approximation sums and can be written as, $$t(x) = I = \sum_{i=o}^{n=r} \frac{(x_1 - x_0)}{v_1} + \frac{(x_2 - x_1)}{v_2} + \ldots + \frac{(x_n - x_{n-1})}{v_n}$$

$$\text{Or, } \sum_{i=1}^{n} \frac{(x_i - x_{i-1})}{v_i} \geq I$$

Where r=radius of a channel and n=distance along the line from wall to radius, using the approximation that the flow is equal through the channel.

The optimal bulk flow rate through the chambers, allowing enough time for particles to collect, can be found using the longest time it takes the particle to reach the wall, i.e. the plane at 190 microns, mid-way between the inter-conductive layer spacing.

$$v_{Bulk} = \frac{0.0035}{381.24} = 9.2 \times 10^{-6}\text{ms}^{-1}: \text{ for 1000 micron chamber}$$

$$v_{Bulk} = \frac{0.0035}{20.83} = 168 \times 10^{-6}\text{ms}^{-1}: \text{ for 500 micron chamber}$$

The volumetric flow rate (Q) through each bore is calculated below:

$$Q_{1000} = {<}B^2 = 7.8\times10^{-6}\times7.8\times10^{-7}$$

$$Q_{1000} = 6.1\times10^{-12} m^3 s^{-1} = 0.022 cm^3 hr^{-1}$$

$$Q_{500} = {<}Br^2 = 168\times10^{-6}\times1.96\times10^{-7}$$

$$Q_{500} = 2.42\times10^{-11} = 0.087 cm^3 hr^{-1}$$

The total volumetric flow required to pass through the cell separators can be found by multiplying the volumetric flow rate by the respective number of bores. The total volumetric flow rate for bore diameters of 1 mm (71 holes) and 0.5 mm (288 holes) are 18.2 ml/hr and 25 ml/hr respectively.

Experimental Results

The total number of cells, as determined by using a haemocytometer, was found by multiplying the number of cells per ml by 6 ml; 5 ml solution cells were collected plus 1 ml passed through the device.

The 200 ml liquid broth was inoculated with 10×107 cells and allowed to incubate. After 24 hours of culturing the cell count was $1.35\times10^8$ cells per ml (dilution factor=100) within a 200 ml beaker. After washing the viable and non-viable cells, they were counted again at $1.7\times10^7$ cells per ml and $2.2\times10^7$ cells per ml respectively. The conductivity of both suspensions was made up to 0.20 $mSm^{-1}$ by the addition of sodium chloride solution to balance the mixtures.

Prior to separation with the device having channels of 500 μm diameter bore, the solution contained a 50:50 mixture of cells. Following the separation the solution had cell counts of $1.1\times10^7$ cells (non-viable) and $8.5\times10^7$ cells (viable) within a 1 ml volume.

Analysis of Experimental Results

From the results, the average percentage of cells not experiencing the DEP force when passed through the separator are 50% and 53% for the 500 μm and 1000 μm bores respectively. Of that the mean volume of non-viable cells was 68% for both sizes, indicating the same proportions of non-viable cells passed through both bore diameters. Of the cells collected in the devices (50% and 53%, mentioned above), for the 500 μm bore chambers the average percentage of viable cells collected was 86% and 14% for the non-viable cells. The bores of 1000 μm diameter had a mean percentage of 73% viable cells collected and 27% non-viable cells.

Although the sample sizes are not large enough for significant statistical calculations and with the introduction of errors, a simple comparison of proportional data allows for quick performance analysis of the device. However, it can be seen that the performance of the devices was high, indicating that cells are experiencing DEP at an applied ac voltage of 10V, 10 MHz.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A dielectrophoretic device for manipulation of suspended particulate matter, comprising:

a three-dimensional laminate of a plurality of interleaved lamellas of electrically conductive and non-conductive material, wherein at least one channel is defined through about 10 to about 50 of the interleaved lamellas of electrically conductive material, and wherein the at least one channel is cylindrical in shape and round in cross-section; and means for electrically connecting the lamellas of electrically conductive material to at least one AC signal, wherein particles travelling through the at least one cylindrical channel exhibit three-dimensional movement.

2. The device according to claim 1, wherein the means for electrically connecting comprises:

means for electrically connecting alternate lamellas of conductive material to a first phase of the at least one AC signal; and means for connecting lamellas of conductive material between those connected to the first phase to a second phase of the at least one AC signal.

3. The device according to claim 1, wherein the means for electrically connecting comprises: (i) means for connecting first alternate lamellas of conductive material to phase, and means for connecting lamellas of conductive material between the first alternate lamellas to ground; or (ii) means for connecting lamellas of conductive material to shifted phases.

4. The device according to claim 1, wherein the means for electrically connecting comprises means for electrically connecting lamellas of conductive material to different AC signals or AC signals of different frequencies.

5. The device according to claim 1, wherein the means for electrically connecting comprises: (i) means for electrically connecting lamellas of conductive material adjacent a first part of a channel to a an AC signal having a first frequency; and (ii) means for electrically connecting lamellas of conductive material adjacent a second part of a channel to a an AC signal having a second frequency.

6. The device according to claim 1, wherein the interleaved lamellas are laminated to provide a laminate which has a length of about 7 cm to about 9 cm and a width of about 10 cm to about 15 cm.

7. The device according to claim 1, wherein alternate lamellas of electrically conductive material project from a first end of the laminate and lamellas of electrically conductive material between the alternate lamellas project from a second end of the laminate distal to the first end.

8. The device according to claim 1, wherein the lamellas of electrically conductive material comprise metal foil or metal coated insulating foil.

9. The device according to claim 1, wherein the lamellas of electrically conductive material have a thickness of about 5 μm to about 15 μm.

10. The device according to claim 1, wherein the lamellas of electrically conductive material comprise a metal selected from a group which consists of aluminum and gold.

11. The device according to claim 1, wherein the lamellas of electrically non-conductive material comprise a low temperature curing polymer film.

12. The device according to claim 1, wherein the lamellas of electrically non-conductive material have a thickness of about 50 μm to about 150 μm.

13. The device according to claim 1, wherein the at least one channel comprises about 50 to about 300 channels.

14. The device according to claim 1, wherein the at least one channel has a diameter of about 0.4 mm to about 1.0 mm.

15. The device according to claim 1, comprising substantially planar lamellas which are substantially parallel; and a longitudinal axis of the at least one channel is inclined substantially perpendicular to the lamellas.

16. The device according to claim 1, for use in high throughput screening wherein the at least one channel is closed at a first end of the channel to provide at least one well or chamber.

17. The device according to claim 16, wherein the at least one well or chamber is defined by a wall of transparent material.

18. The device according to claim 16, wherein the lamellas of conductive material are selected from a group which consists of indium tin oxide and the lamellas of non-conductive material are selected from a group which consists of polycarbonate, polymethylmethacylate (Perspex) or polyethylenetelephthalate (PET).

19. The device according to claim 16, wherein a first end of the at least one well or chamber comprises a transparent material.

20. The device according to claim 19, wherein the transparent material is selected from a group which consists of glass, quartz polycarbonate and polymethylmethacylate (Perspex).

21. The device according to claim 1, comprising a number of channels sufficient to provide a multi well plate.

22. The device according to claim 1, wherein the at least one channel comprises 1536 channels.

23. A method for production of a device for three dimensional dielectrophoretic manipulation of suspended particulate matter, the method comprising:

laminating about 10 to about 50 alternate lamellas of electrically conductive and non-conductive material to produce a three-dimensional laminate;

allowing the laminate to cure;

drilling channels in the laminate, each channel having a cylindrical shape and round cross-section; and electrically connecting the lamellas of electrically conductive material to at least one AC signal, wherein particles travelling through the at least one cylindrical channel exhibit three-dimensional movement.

24. The method according to claim 23, wherein the electrically connecting comprises connecting successive lamellas of electrically conductive material to different electrical potentials or phase shifts.

25. A system for three dimensional dielectrophoretic manipulation of suspended particulate matter, the system comprising:

a three-dimensional laminate of a plurality of interleaved lamellas of electrically conductive and non-conductive material, wherein at least one channel is defined through about 10 to about 50 of the interleaved lamellas of electrically conductive material, and wherein the at least one channel is cylindrical in shape and round in cross-section;

means for electrically connecting the lamellas of electrically conductive material to at least one AC signal, wherein particles travelling through the at least one cylindrical channel exhibit three-dimensional movement; and at least one AC signal generator.

26. The device according to claim 1, wherein the at least one channel comprises about 300 to about 2000 channels.

* * * * *